United States Patent
Byun et al.

(10) Patent No.: US 10,200,888 B2
(45) Date of Patent: Feb. 5, 2019

(54) METHOD AND APPARATUS FOR GENERATING INTER-CELL INFORMATION FOR INTER-CELL INTERFERENCE REMOVAL

(71) Applicant: LG ELECTRONICS INC., Seoul (KR)

(72) Inventors: Ilmu Byun, Seoul (KR); Heejeong Cho, Seoul (KR); Hyunsoo Ko, Seoul (KR); Kungmin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 3 days.

(21) Appl. No.: 15/546,155

(22) PCT Filed: Jan. 27, 2015

(86) PCT No.: PCT/KR2015/000826
§ 371 (c)(1),
(2) Date: Jul. 25, 2017

(87) PCT Pub. No.: WO2016/122012
PCT Pub. Date: Aug. 4, 2016

(65) Prior Publication Data
US 2018/0007570 A1    Jan. 4, 2018

(51) Int. Cl.
*H04B 7/06* (2006.01)
*H04W 24/02* (2009.01)
(Continued)

(52) U.S. Cl.
CPC .......... *H04W 24/02* (2013.01); *H04B 7/0417* (2013.01); *H04B 7/0452* (2013.01);
(Continued)

(58) Field of Classification Search
None
See application file for complete search history.

(56) References Cited

U.S. PATENT DOCUMENTS 9,369,922 B2 * 6/2016 Han ................... H04W 28/12
2014/0036664 A1 * 2/2014 Han ..................... H04W 4/70
370/230
(Continued)

FOREIGN PATENT DOCUMENTS

KR  10-2010-0002114 A   1/2010
KR  10-2012-0011794 A   2/2012
(Continued)

OTHER PUBLICATIONS

Renesas Mobile Europe Ltd, "Discussion on Multi-Cell Periodic CSI Multiplexing", R1-122338: 3GPP TSG RAN WG1 Meeting #69 Prague, Czech Republic, May 21-25, 2012, pp. 1-4.

*Primary Examiner* — Brian S Roberts
(74) *Attorney, Agent, or Firm* — Birch, Stewart, Kolasch & Birch, LLP

(57) ABSTRACT

Provided is a method for generating inter-cell information for inter-cell interference removal in a wireless communication system. A method by which a terminal removes inter-cell interference comprises the steps of: receiving a signal from a serving cell and a neighboring cell adjacent to the serving cell; identifying the priority of the serving cell for feedback of channel information on the basis of an identifier of the cell and a resource block; identifying whether there is feedback of channel information on the signal received on the basis of the priority; and transmitting the channel information to a base station of the serving cell according to the identification of whether there is feedback.

8 Claims, 10 Drawing Sheets

(51) Int. Cl.
    *H04B 17/24*         (2015.01)
    *H04B 17/345*      (2015.01)
    *H04B 7/0417*      (2017.01)
    *H04B 7/0452*      (2017.01)

(52) U.S. Cl.
    CPC ........... *H04B 7/0632* (2013.01); *H04B 17/24* (2015.01); *H04B 17/345* (2015.01)

(56) References Cited

U.S. PATENT DOCUMENTS

| | | | | |
|---|---|---|---|---|
| 2014/0185543 A1* | 7/2014 | Kang | .................... | H04B 7/0626 |
| | | | | 370/329 |
| 2014/0226612 A1* | 8/2014 | Kim | ....................... | H04B 7/024 |
| | | | | 370/329 |

FOREIGN PATENT DOCUMENTS

| KR | 10-2013-0025427 A | 3/2013 |
|---|---|---|
| KR | 10-2014-0052020 A | 5/2014 |

\* cited by examiner

Case 1  Case 2

METHOD AND APPARATUS FOR GENERATING INTER-CELL INFORMATION FOR INTER-CELL INTERFERENCE REMOVAL

CROSS REFERENCE TO RELATED APPLICATIONS

This application is the National Phase of PCT International Application No. PCT/KR2015/000826, filed on Jan. 27, 2015, which is hereby expressly incorporated by reference into the present application.

BACKGROUND OF THE INVENTION

Field of the Invention

The present invention relates to a method and apparatus for generating an inter-cell information for removing inter-cell interference, and more particularly, to a method and apparatus for generating inter-cell information for removing inter-cell interference in a massive MIMO system.

Related Art

Recently, commercialization of the long term evolution (LTE) system, which is the next generation of wireless communication systems, has been supported earnestly. After the necessities were recognized that mass data service is to be supported in high-quality in response to users' request as well as voice service while ensuring users' mobility, the trend is that such an LTE system has been more rapidly expanded. The LTE system provides low transmission delay, high transmission rate, high system capacity and coverage improvement.

Owing to the advent of such a high-quality service, needs for wireless communication service have been abruptly increased. In order to actively cope with such a situation, more than anything else, the capacity of the communication system should be increased. The way for increasing the communication capacity in the wireless communication environment may include a method for newly finding available frequency band and a method for increasing efficiency for the limited resource.

As a method for increasing efficiency of the limited resource, a technique for increasing a transmission capacity, so-called the multiple antenna transmission and reception technique has been vigorously developed with a great attention, which takes a diversity gain by additionally securing the spatial area for the resource utilization by mounting multiple antennas on a transceiver or increases a transmission capacity by transmitting data in parallel through each antenna.

In the multiple antenna system, the beamforming and the precoding may be used for increasing the Signal to Noise Ratio (SNR). In the closed-loop system that may use feedback information in a transmission end, the beamforming and the precoding are used for maximizing the SNR through the corresponding feedback information.

Such feedback information may include a Modulation and coding scheme (MCS) level. In the case that a user equipment is able to remove an interference signal, it is required to maintain the MCS level stably.

SUMMARY OF THE INVENTION

An aspect of the present invention is to propose a method and apparatus for generating inter-cell information for performing an inter-cell interference removal in a massive MIMO communication system in a small cell.

An aspect of the present invention is to propose a method and apparatus for sharing and updating channel information so as to perform an inter-cell interference removal in a massive MIMO system in a small cell.

A method for removing inter-cell information performed by a user equipment according to the present invention may include receiving a signal from a serving cell and a neighboring cell adjacent to the serving cell, identifying a priority of the serving cell for feedback of channel information based on an identifier of a cell and a resource block, identifying whether to feedback the channel information of a received signal based on the priority, and transmitting the channel information to a base station of the serving cell depending on whether there is the identified feedback.

Advantageous Effects

According to an aspect of the present invention, it is proposed a method and apparatus for transmitting and receiving inter-cell information for performing an inter-cell interference removal in a massive MIMO communication system.

According to an aspect of the present invention, it is proposed a method and apparatus for sharing and updating channel information so as to perform an inter-cell interference removal in a massive MIMO system in a small cell.

In addition, according to an aspect of the present invention, in the environment in which the change of an MCS level is frequent, a user equipment may remove an interference signal stably, and may decode its own signal.

DESCRIPTION OF EXEMPLARY EMBODIMENTS

The present specification describes wireless communication network as an object, the tasks performed in the wireless communication network may be performed during the process of controlling the network in the system (for example, a base station) that controls the corresponding wireless communication network and transmitting data, or performed by the user equipment that is coupled to the corresponding wireless network.

Figure 1:
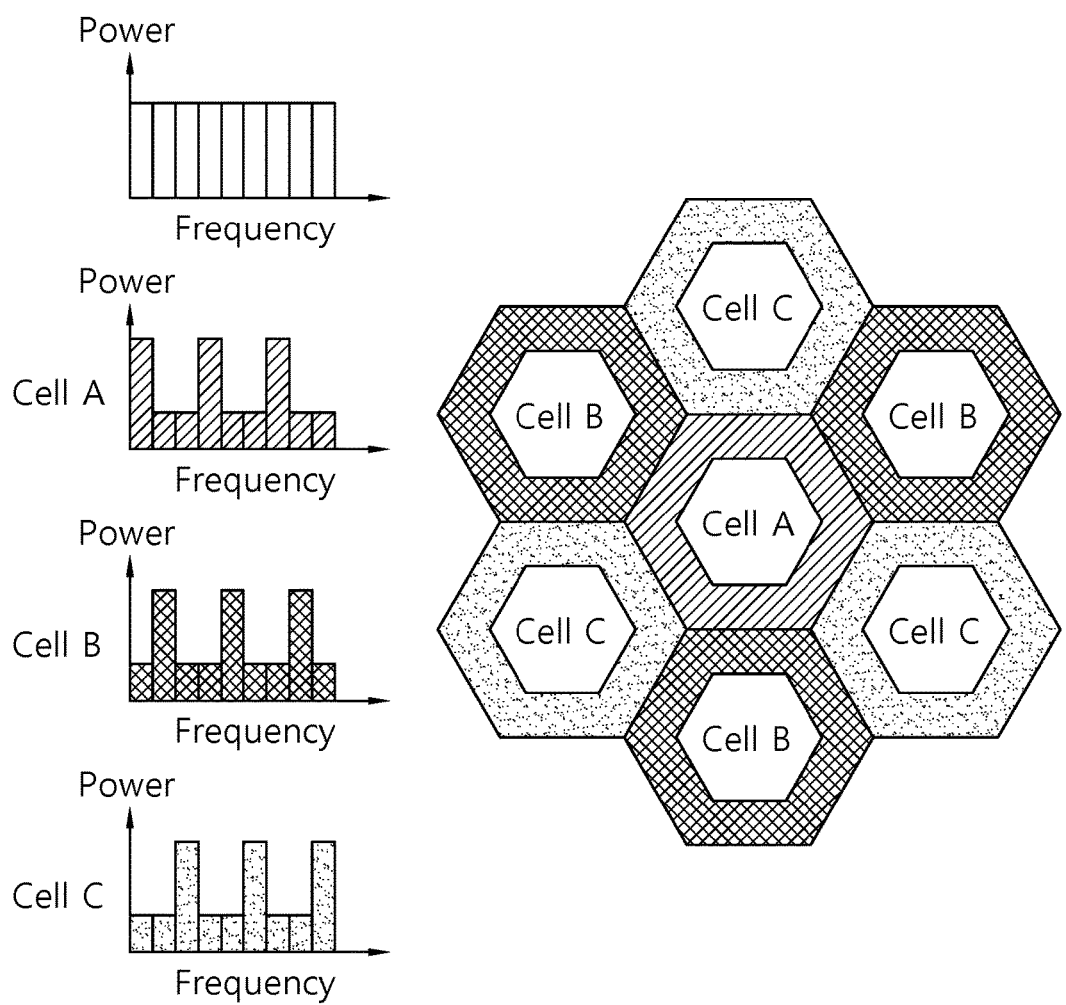
FIG. 1 is a diagram for describing the inter-cell interference coordination in the LTE system.

FIG. 1 is a diagram for describing the inter-cell interference coordination in the LTE system.

In the LTE system, each cell may be divided into interior and exterior. In the interior cell in which a user undergoes interference of low level and low power is required for the communication with a serving cell, the frequency reuse factor is 1.

In the case of the exterior cell, when the cell schedules a user to a part of given band, the system capacity may be optimized for the case that neighboring cells do not transmit anything or the case that neighboring cells transmit low power to the users existed inside of adjacent cells in order to avoid strong interference that may occur for the user scheduled in the first cell.

Such a limitation brings about the result of increasing the frequency reuse rate in a cell-edge, which is known as the partial frequency reuse as shown in FIG. 1.

As shown in FIG. 1, each of the cells A, B and C may be divided into interior area and exterior area, and the frequency resource for each cell-edge is allocated to a cell in order not to be overlapped in an adjacent cell. In the case that a specific frequency resource is allocated to the exterior area of cell A, the corresponding frequency resource is not allocated in cell B and cell C. And in the case that a specific frequency resource is allocated to the exterior area of cell B, the corresponding frequency resource is not allocated in cell A and cell C. In the same way, in the case that a specific frequency resource is allocated to the exterior area of cell C, the corresponding frequency resource is not allocated in cell A and cell B.

In order to coordinate the scheduling for other cells in such a way, a communication is required between neighboring cells. In the case that the neighboring cells are managed by the same base station (e.g., eNodeB), the coordinated scheduling plan may be performed without request for a standardized signaling. However, in the case that the neighboring cells are managed by different base stations, particularly, in the multivendor networks, the standardized signaling is important.

In LTE, it is assumed that the Inter-Cell Interference Coordination (ICIC) is managed in the frequency domain, rather than in the time domain, and the signaling between base stations is designed for supporting it. This is because the time domain coordination may interfere with the operation for the HARQ process like the uplink in which the synchronous Hybrid Automatic Repeat reQuest (HARQ) is used.

Regarding a downlink transmission, the bitmap expressed by a Relative Narrowband Transmit Power (RNTP) may be exchanged through an X2 interface. Each bit of an RNTP indicator that corresponds to a single resource block in the frequency domain is used for notifying whether to maintain the transmission power for the resource block below a specific upper limit to neighboring base stations. Such an upper limit and the term of validity may be preconfigured.

For example, when the RNTP indicator is 1, which represents a state that the transmission power is maintained to a specific resource block, that is, a signal transmission, and when the RNTP indicator is 0, which represents a state that a signal is not transmitted to the corresponding resource block, that is, a state that beamforming is not performed.

Accordingly, the degree of interference anticipated in each resource block may be considered when neighboring cells schedule a user in their own cells.

In the case that a base station receives the information that the transmission power of the resource block in a neighboring cell is high, the follow-up operation is not consistent. Accordingly, a certain degree of freedom is allowed for performing the scheduling algorithm. However, a typical operation may have a user in a cell-edge avoid scheduling for the resource block of which transmission power is high.

In the definition of an RNTP indicator, the transmission power per antenna port may be normalized by the maximum output power of a base station or a cell. This is because the cell that has small maximum output power owing to its small size may undergo greater interference than the cell that has great maximum output power that corresponds to the cell of which size is great.

The determination for the RNTP indicator may be performed by Equation 1.

$$RNTP(n_{PRB}) = \begin{cases} 0 \text{ if } \dfrac{E_A(n_{PRB})}{E_{max\_nom}^{(p)}} \leq RNTP_{threshold} \\ 1 \text{ if no promise about the upper limit of } \dfrac{E_A(n_{PRB})}{E_{max\_nom}^{(p)}} \text{ is made} \end{cases} \quad \text{[Equation 1]}$$

In Equation 1, $E_A(n_{PRB})$ represents the maximum intended energy per resource element (EPRE) of a UE-specific physical downlink shared channel (PDSCH) REs for an orthogonal frequency division multiplexing (OFDM) symbol that does not include a reference signal (RS) in the physical resource block for antenna port p during the next specific time duration, and $n_{PRB}$ represents the number of physical resource blocks. $n_{PRB}$ may have a value from 0 to $N_{RB}^{DL}-1$. $RNTP_{threshold}$ may have a value belonged to $\{-\infty, -11, -10, -9, -8, -7, -6, -5, -4, -3, -2, -1, 0, +1, +2, +3\}$[dB] ($RNTP_{threshold} \varepsilon \{-\infty, -11, -10, -9, -8, -7, -6, -5, -4, -3, -2, -1, 0, +1, +2, +3\}$[dB]).

In addition, in Equation 1, $E^{(p)}_{max\_nom}$ may be expressed as Equation 2.

$$E_{max\_nom}^{(p)} = \dfrac{P_{max}^{(p)} \cdot \dfrac{1}{\Delta f}}{N_{RB}^{DL} \cdot N_{SC}^{RB}} \quad \text{[Equation 2]}$$

In Equation 2, $\Delta f$ represents a subcarrier spacing, and $N_{RB}^{DL}$ represents a Downlink bandwidth configuration. And $N_{SC}^{RB}$ represents a resource block size in the frequency domain, expressed as the number of subcarriers.

According to Equation 1, the RNTP indicator becomes 0 when the energy $$\left(\frac{E_A(n_{PRB})}{E_{max\_nom}^{(p)}}\right)$$

of a normalized RE is equal or smaller than RNTP$_{threshold}$ which is preconfigured, and becomes 1 in the case that there is no rule in the upper limit of the energy $$\left(\frac{E_A(n_{PRB})}{E_{max\_nom}^{(p)}}\right)$$

of a normalized RE. That is, the RNTP indicator may become 1 when $$\frac{E_A(n_{PRB})}{E_{max\_nom}^{(p)}}$$

is greater than RNTP$_{threshold}$.

Meanwhile, in a system like a Coordinated Multipoint (CoMP) between base stations, interference information is exchanged between base stations, and a UE scheduling may be performed based on the information.

Figure 2:
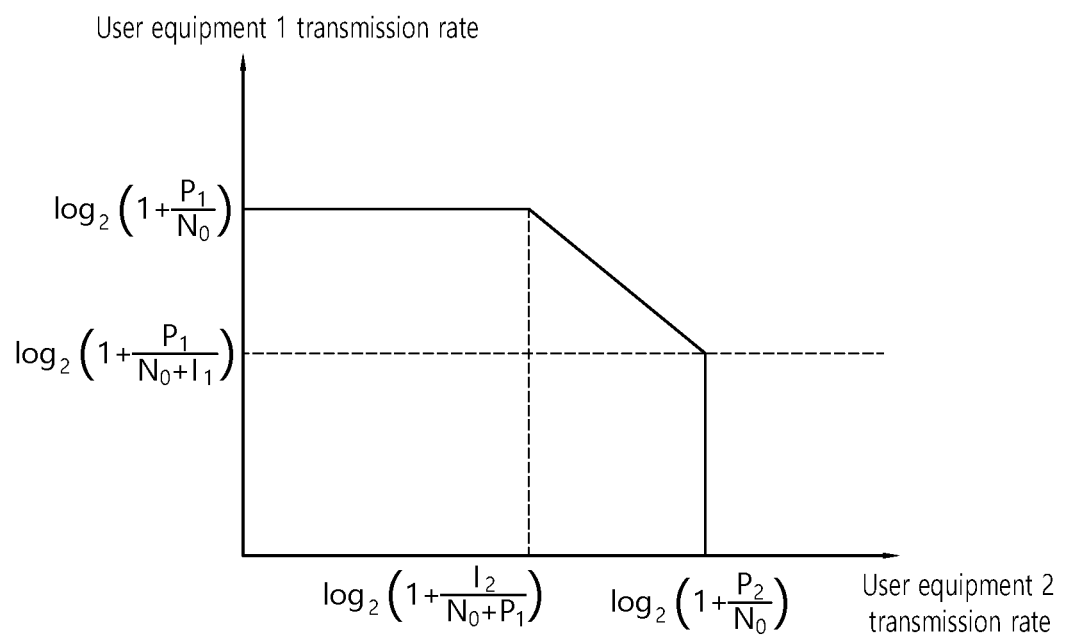
FIG. 2 is a diagram illustrating the transmission rate of user equipment 1 according to the transmission rate of user equipment 2.

FIG. 2 is a diagram illustrating the transmission rate of user equipment 1 according to the transmission rate of user equipment 2.

It is assumed that two user equipments sharing the same channel are existed, base station 1 transmits signal S1 to user equipment 1, and base station 2 transmits signal S2 to user equipment 2. In this case, it may be represented that the size of S1 received by user equipment 1 is P1, the size of S2 received by user equipment 1 is I1, the size of S2 received by user equipment 2 is P2, and the size of S1 received by user equipment 2 is I2.

In the case that user equipment 1 includes an interference removing receiver that may remove an interference signal, the theoretical communication capacity that may be obtained by user equipment 1 is as represented by the solid line in FIG. 2.

As shown in FIG. 2, user equipment 1 may obtain the maximum transmission rate $$\log_2\left(1 + \frac{P_1}{N_0}\right)$$

when the transmission rate of user equipment 2 is $$\log_2\left(1 + \frac{I_2}{N_0 + P_1}\right)$$

or less. On the other hand, in the case that the transmission rate of user equipment 2 is $$\log_2\left(1 + \frac{P_2}{N_0}\right)$$

or more and user equipment 1 fails to recover the signal of user equipment 2, user equipment 1 also fails to recover its own signal.

In the section in which the transmission rate of user equipment 2

$$\log_2\left(1 + \frac{I_2}{N_0 + P_1}\right)$$

or more and $$\log_2\left(1 + \frac{P_2}{N_0}\right)$$

or less, that is, in the diagonal line of FIG. 2, the transmission rate of user equipment 1 may be obtained through time and frequency division.

The horizontal dotted line in FIG. 2 represents a transmission rate in the case that user equipment 1 uses an interference suppressing receiver. That is, in the case that user equipment 1 does not recover but suppresses the signal of user equipment 2, user equipment 1 may obtain uniform transmission rate regardless of the transmission rate.

The network assisted interference cancellation and suppression (NAICS) technique that has been currently discussed in the standard indicates a cell-ID of the cell in which a base station exerts interference to a user equipment, a power ratio between a reference signal and a data signal and reference signal deployment information. The user equipment may perform a blind decoding of the interference signal of a neighboring cell by utilizing the information received from the base station, and through this, may remove the interference signal.

The user equipment that is succeeded in an interference removal may generate channel information based on the channel state of the signal on which the interference removal is succeeded, and may feedback it to the base station. The base station that receives the feedback information for the interference removal may identify that the channel state is improved based on it, and accordingly, may increase a Modulation and coding scheme (MCS) level of the signal. In this case, the reception transmission rate of the user equipment may be improved.

However, in the case that the base station increases the MCS level according to the channel state in which the interference removal is succeeded, in order for the user equipment to successfully receive a signal according to the increased MCS level, the user equipment should be able to remove interference continuously even in the situation that the user equipment feedbacks the channel information and receives a signal again.

In order for the user equipment to be able to remove interference continuously, the transmission power size of the interference signal, an MCS level, a channel state, and so on should be maintained to be a predetermined level for a predetermined time. In the case that the transmission power size of the interference signal is abruptly decreased, the MCS level increases or the channel state is changed, the user equipment may fail to decode the interference signal, and the situation that interference removal is not performed may occur.

In this case, when the user equipment fails to remove interference, a problem occurs that the user equipment is unable to decode the received signal by itself.

An aspect of the present invention may be applied to the case that the user equipments including an interference removing receiver are distributed in a small cell. Since the main object of the small cell is to support the user having low mobility basically, the interference signal generated in the small cell has the property that the change of transmission power and channel state is small. Accordingly, an aspect of the present invention is mainly targeted to solve the situation in which it becomes hard to remove interference owing to the increase of an MCS level.

Generally, it may be assumed that an MCS level is maintained in a certain level when there is no change in a channel state. However, in the case that a user equipment includes an interference removing receiver, the MCS level may be changed depending on whether the interference removal is succeeded.

Figure 3:
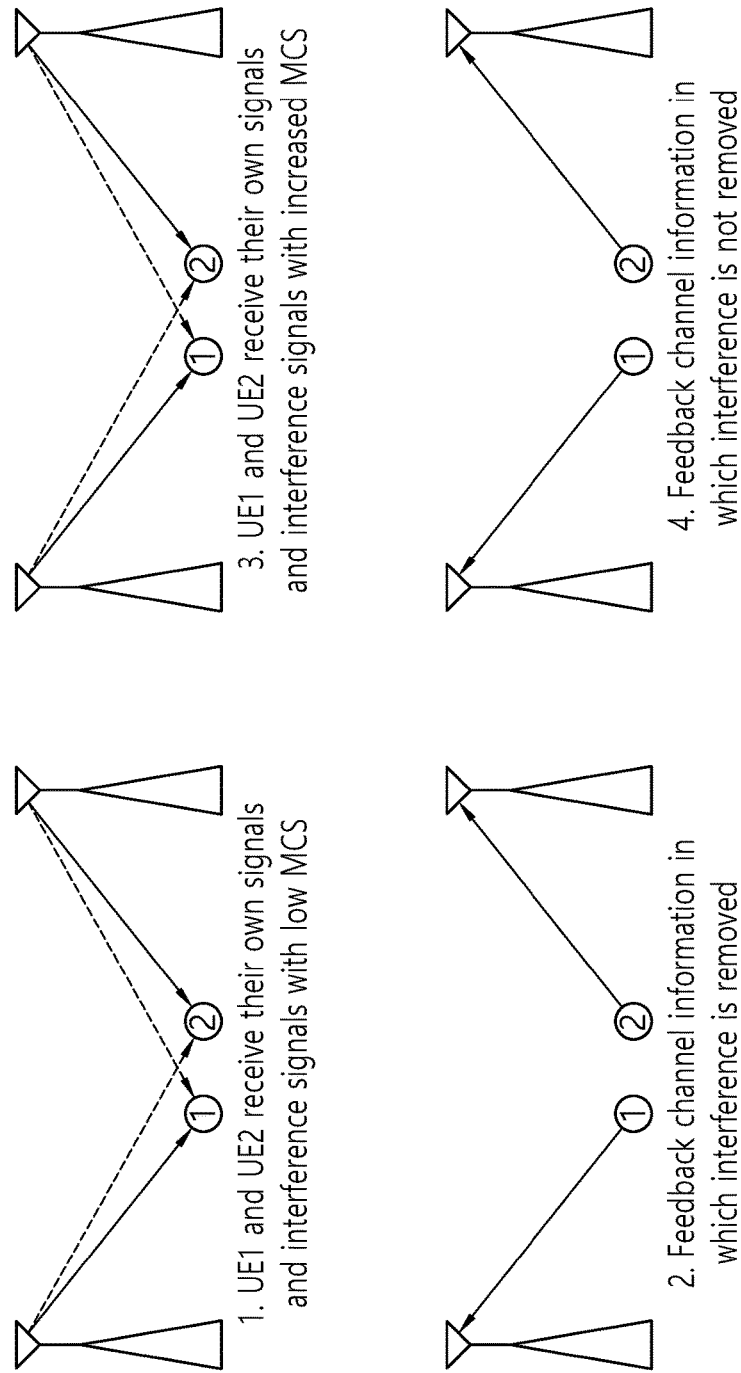
FIG. 3 is a diagram illustrating the ping-pong effect of a link adaptation according to the change of an MCS level.

FIG. 3 is a diagram illustrating the ping-pong effect of a link adaptation according to the change of an MCS level.

In the case that both of two user equipments in a cell-edge area include an interference removing receiver, the ping-pong effect shown in FIG. 3 may occur.

(1) of FIG. 3 shows the case that user equipment 1 and user equipment 2 that receive a signal from a neighboring cell receive their own signals of which MCS level is low and interference signals, and (2) of FIG. 3 shows the case that user equipment 1 and user equipment 2 determine that they may remove the interference signal of low MCS level and feedback the channel information in which interference is removed to each base station.

As described above, by utilizing the information received from a base station, a user equipment may perform the blind decoding of the interference signal of a neighboring cell, and through this, may remove the interference signal.

The user equipment that is succeeded in the interference removal may generate channel information based on the channel state of the signal on which the interference is succeeded, and may feedback it to the base station.

(3) of FIG. 3 shows the case that each base station transmits a signal after increasing an MCS level based on the on which the interference is removed, and (4) of FIG. 3 shows the case that user equipment 1 and user equipment 2 fail to recover the interference signal corresponding to the increased MCS level and their own signal and feedback the channel information in which the interference is not removed to the base station.

In this case, the base station may decrease the MCS level according to the feedback information, and user equipment 1 and user equipment 2 may receive the signal according to the low MCS level as shown in 1 of FIG. 3 again. That is, since the MCS level is not maintained continuously for a predetermined time but changed, decoding of the signal and the interference signal may be possible or impossible, the ping-pong phenomenon in which cases 1 to 4 of FIG. 3 are repeated may occur.

Figure 4:
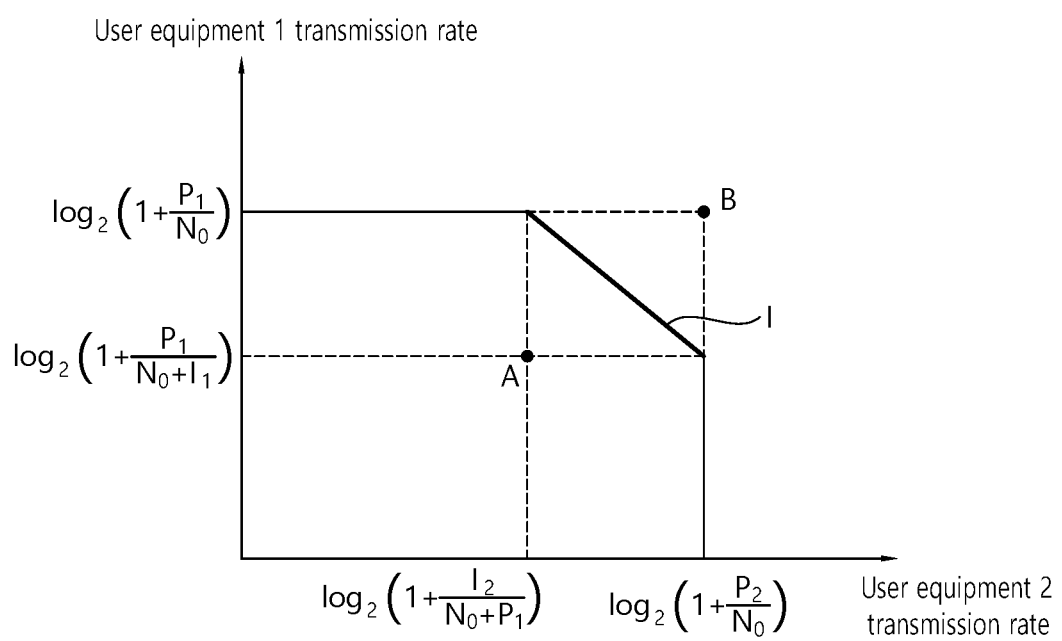
FIG. 4 is a diagram illustrating the transmission rate change according to an interference removal and suppression.

FIG. 4 is a diagram illustrating the transmission rate change according to an interference removal and suppression.

The case of 1 of FIG. 3 is the case in which the transmission rate of user equipment 1 and user equipment 2 is low and corresponds to A in FIG. 4. And 3 of FIG. 3 corresponds to the case of increasing the MCS level in the case that user equipment 1 and user equipment 2 increase the transmission rate over the channel capacity and corresponds to B in FIG. 4.

B is located in the area beyond the channel communication area of user equipment 1 and user equipment 2, that is, the area in which actual communication is impossible. When the ping-pong effect occurs in the link adaptation, the transmission rate of user equipment 1 and user equipment 2 go back and forth between A and B, and accordingly, user equipment 1 and user equipment 2 fail to receive a signal (B of FIG. 4) or succeed in signal reception of small amount (A in FIG. 4).

In order to optimize the system capacity, user equipment 1 and user equipment 2 should obtain the transmission rate that corresponds to the bold line (I) of FIG. 4, not A and B. The present invention proposes a method for minimizing occurrence of A and B of FIG. 4 and maximizing the sum of transmission rates of user equipment 1 and user equipment 2. Hereinafter, according to an aspect of the present invention, a method for updating interference removing channel information will be described for preventing the ping-pong effect that occurs in the link adaptation.

The basic concept of the channel information update for interference removal according to the present invention is as follows.

First, according to a cell-ID that distinguishes cells, the update priority of the channel information for interference removal may be allocated for each resource.

When a user equipment feedbacks channel information periodically, the user equipment existed in a cell of which channel information update priority is the highest for interference removal among neighboring cells in a specific resource may feedback the channel information considering an interference removal success rate to a base station.

In addition, a base station in a cell of which channel information update priority is the highest for interference removal among neighboring cells in a specific resource may improve an MCS level using the channel information considering an interference removal success rate without the coordination with the neighboring cell.

In this case, the user equipment may store the cell-ID of which priority is the highest for each specific resource in advance. Of course, the user equipment may receive the information of a cell-ID, for example, the cell-ID of which the priority is the highest from the base station.

Second, a user equipment in a cell of which priority is low may update the channel information for the interference removal in a format of an event trigger.

The base station that manages the cell corresponding to a cell-ID of which a priority is low and the user equipment existed in the corresponding cell may determine whether to utilize the channel for the interference removal through the coordination with the cell of which priority is high. When it is determined whether to utilize the channel information, the base station may determine an MCS level of the transmitted signal.

In the case that two cells of which priority is high are existed adjacent to the cell of which priority is low and two cells are adjacent, the channel information of the cell of which priority is low may be coordinated with the cell of which priority is the highest.

In the case of assuming a small cell including the base station having an Omni-antenna through which signals propagate to all directions, not having the directionality, the small cell may include at least 6 cells adjacent with each other as shown in FIG. 1.

When an NID is referred to as a cell-ID, an NPB is referred to a resource block index, and a resource block (RB) is referred to a unit of a bundle of resources, in the present invention, the RB used for the channel information for the interference removal may have a plurality of resource units that a base station uses when scheduling.

As described above, in the case that 6 adjacent cells are aggregated, the priority of the channel information update for the interference removal may be configured as represented in Table 1.

TABLE 1

| Cell-ID | Priority for each cell |
|---|---|
| mod($N_{ID}$, 7) = 0 | 1 |
| mod($N_{ID}$, 7) = 1 | 2 |
| mod($N_{ID}$, 7) = 2 | 3 |
| mod($N_{ID}$, 7) = 3 | 4 |
| mod($N_{ID}$, 7) = 4 | 5 |
| mod($N_{ID}$, 7) = 5 | 6 |
| mod($N_{ID}$, 7) = 6 | 7 |

As represented in Table 1, according to the remainder after the cell-ID is divided by 7 (modular operation), a priority may be determined for each cell.

In the case of allocating a priority is allocated to a cell as represented in Table 1, since it is probable that only a specific cell utilizes the channel information for the interference removal, it is required to differently allocate a priority to each resource. That is, since only a specific cell is beneficial to utilize the channel information, in order to prevent it, the priority may be differently allocated to each resource as represented in Table 2.

TABLE 2

| Cell-ID | mod($N_{RB}$7) = 0 | mod($N_{RB}$7) = 1 | mod($N_{RB}$7) = 2 | mod($N_{RB}$7) = 3 | mod($N_{RB}$7) = 4 | mod($N_{RB}$7) = 5 | mod($N_{RB}$7) = 6 |
|---|---|---|---|---|---|---|---|
| mod($N_{ID}$7) = 0 | 1 | 7 | 6 | 5 | 4 | 3 | 2 |
| mod($N_{ID}$7) = 1 | 2 | 1 | 7 | 6 | 5 | 4 | 3 |
| mod($N_{ID}$7) = 2 | 3 | 2 | 1 | 7 | 6 | 5 | 4 |
| mod($N_{ID}$7) = 3 | 4 | 3 | 2 | 1 | 7 | 6 | 5 |
| mod($N_{ID}$7) = 4 | 5 | 4 | 3 | 2 | 1 | 7 | 6 |
| mod($N_{ID}$7) = 5 | 6 | 5 | 4 | 3 | 2 | 1 | 7 |
| mod($N_{ID}$7) = 6 | 7 | 6 | 5 | 4 | 3 | 2 | 1 |

Table 2 represents the interference control priority for each RB in a cell including Omni-antenna base stations. As represented in Table 2, the priority is determined for each resource corresponding to a specific cell.

A user equipment may store the diagonal parts of Table 2, and accordingly, may identify the position of the RB of which priority is 1 for each cell-ID. For example, in the case that the user equipment is existed in the cell of which remainder after the cell-ID is divided by 7 is 0, the user equipment may report the channel information for the interference removal to a base station with the first priority for the RB of which remainder after the cell-ID is divided by 7 is 0. In the same way, in the case that the user equipment knows the information of the diagonal parts of Table 2, in the case that the user equipment is existed in the cell of which remainder after the cell-ID is divided by 7 is 1, the user equipment may report the channel information for the interference removal to a base station with the first priority for the RB of which remainder after the cell-ID is divided by 7 is 1.

In this way, a user equipment may feedback the interference removing channel information for a specific RB to a base station freely by identifying a cell-ID only.

Table 1 and Table 2 are filled out by performing a modular operation based on 7, but may be extended to the case of using the modular operation of different number in the same way.

Figure 5:
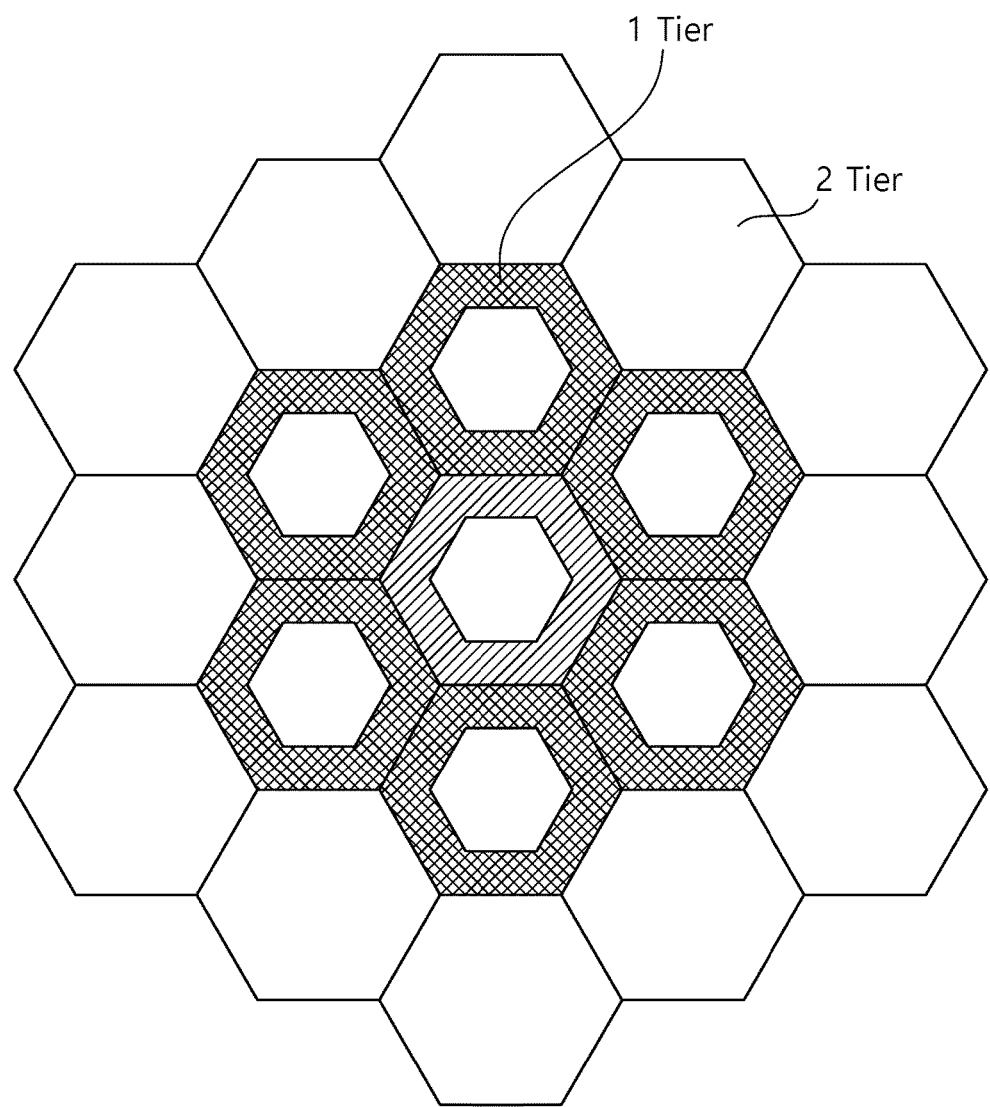
FIG. 5 is a diagram for describing a priority of a channel information transmission according to a cell structure according to another embodiment of the present invention.

FIG. 5 is a diagram for describing a priority of a channel information transmission according to a cell structure according to another embodiment of the present invention.

For example, in a small cell, as a distance between cells is decreased, interference may be exerted to an adjacent 2 tier cell, not a 1 tier cell. FIG. 5 shows the cell structure in the case that an interference signal of the small cell influences on two tier cells.

In this case, the modular operation may be performed by including up to 2 tier cells, and the modular operation may be performed using 19.

This is generalized as follows. In the small cell in which 6 cells adjacent to a cell may be existed as shown in FIG. 1, in the case that n tiers are existed, the modular operation for determining a priority may be performed based on Equation 3 below.

$$\mod\left(N_{ID}, 1 + \sum_{k=1}^{n} 6k\right) \quad \text{[Equation 3]}$$

According to Equation 3, when it is assumed that interference of a cell is exerted on a 3 tier cell, the modular operation may be performed based on 37, and based on it, the priority for the channel information feedback may be determined.

Different from the embodiment described above, in the network that includes a base station transmitting a signal using a directional antenna, each cell may be divided into a plurality of sectors.

Figure 6:
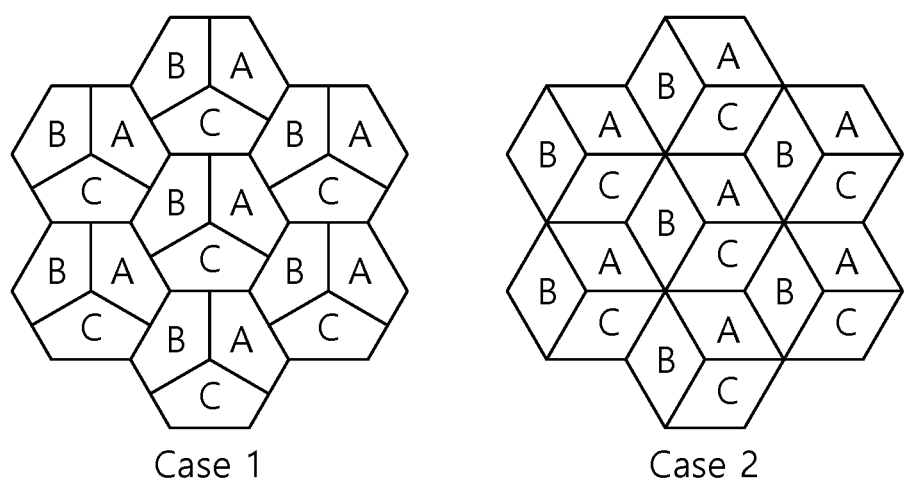
FIG. 6 is a diagram illustrating a cell structure according to an embodiment of the present invention, and each base station is divided into 3 sectors.

FIG. 6 is a diagram illustrating a cell structure according to an embodiment of the present invention, and each base station is divided into 3 sectors.

Each sector may have different cell-ID.

In the cell structure shown in the right side of FIG. 6, the number of sectors that exerts interference on a neighboring sector is 5, and in the cell structure shown in the left side of FIG. 6, the number of sectors that exerts interference on a neighboring sector is 3.

In FIG. 6, A, B and C represent the sectors managed by the same base station. That is, a base station may transmit a signal using three directional antenna arrays, and correspondingly, three sectors may be existed. Since A, B and C sectors are managed by the same base station, it is available for the base station to schedule such that interference is not overlapped.

Table 3 below represents a scheme of setting an interference removing priority for each RB in the right cell structure of FIG. 6.

TABLE 3

| Cell-ID | mod($N_{RB}$, 5) = 0 | mod($N_{RB}$, 5) = 1 | mod($N_{RB}$, 5) = 2 | mod($N_{RB}$, 5) = 3 | mod($N_{RB}$, 5) = 4 |
|---|---|---|---|---|---|
| mod($N_{ID}$, 5) = 0 | 1 | 5 | 4 | 3 | 2 |
| mod($N_{ID}$, 5) = 1 | 2 | 1 | 5 | 4 | 3 |

TABLE 3-continued

| Cell-ID | mod($N_{RB}$, 5) = 0 | mod($N_{RB}$, 5) = 1 | mod($N_{RB}$, 5) = 2 | mod($N_{RB}$, 5) = 3 | mod($N_{RB}$, 5) = 4 |
| --- | --- | --- | --- | --- | --- |
| mod($N_{ID}$, 5) = 2 | 3 | 2 | 1 | 5 | 4 |
| mod($N_{ID}$, 5) = 3 | 4 | 3 | 2 | 1 | 5 |
| mod($N_{ID}$, 5) = 4 | 5 | 4 | 3 | 2 | 1 |

In the cell structure show in the right side of FIG. 6, since the number of sectors that exerts interference on a neighboring sector is 5, the modular operation for a cell-ID and an RB may be performed based on 5.

According to the present invention, when utilizing the channel information for removing interference, a user equipment and a base station in the cell of which priority is low may determine whether to utilize the interference removing channel information through the coordination with a base station of which priority is higher.

The base station of which priority is low requests to utilize the channel information to the base station of which priority is high, and it is not required to request the coordination to the base station of which priority is lower than its own priority. Accordingly, there is an advantage that the amount of interference exchange between cells may be decreased.

Figure 7:
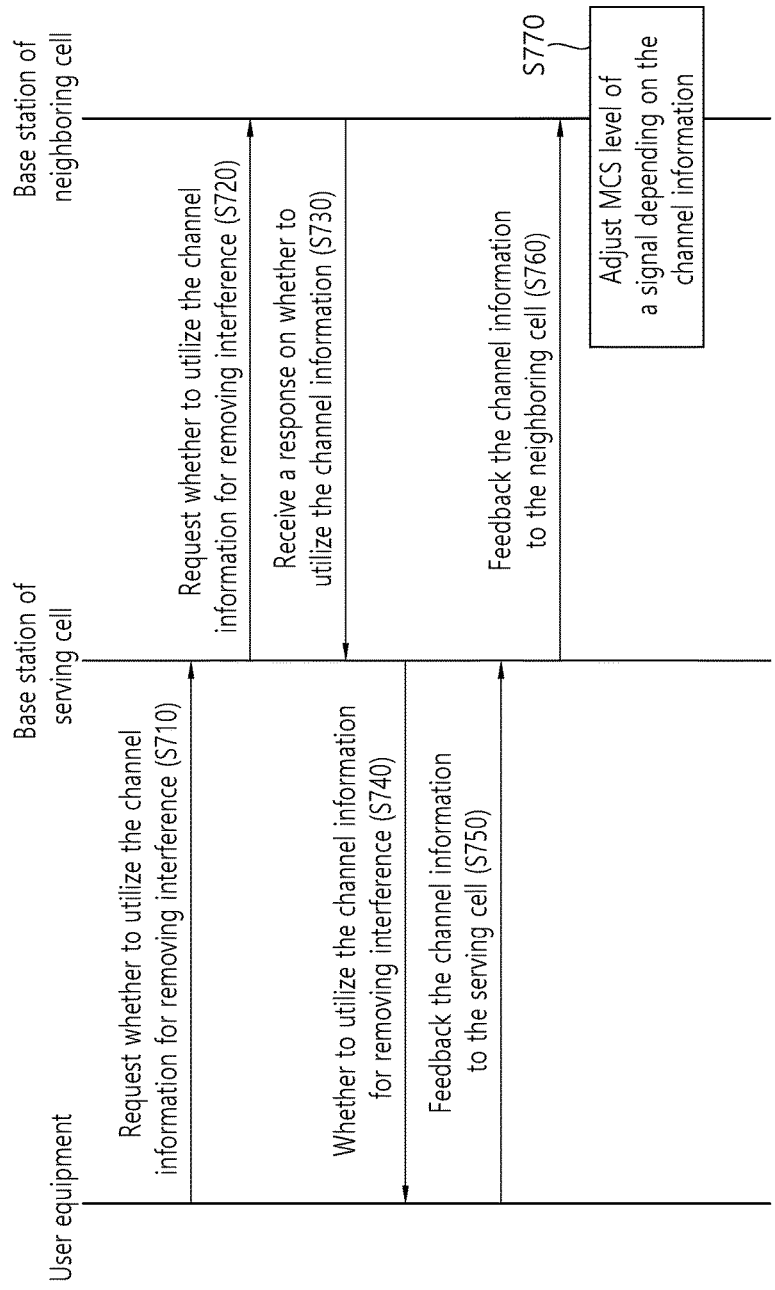
FIG. 7 is a control flowchart for describing a method for configuring a priority of utilizing inter-cell channel information according to an aspect of the present invention.

FIG. 7 is a control flowchart for describing a method for configuring a priority of utilizing inter-cell channel information according to an aspect of the present invention. FIG. 7 describes the case that a user equipment determines whether the interference removal is available and requests whether to utilize the channel information to a base station first.

First, the user equipment may request whether to utilize the channel information for removing interference to the base station of a serving cell to which the user equipment is belonged (step, S710). In this case, the user equipment may request whether to utilize the channel information to the base station using a signal of 1 bit.

The base station that receives the request on whether to utilize the channel information for removing interference may request whether to utilize the interference removing channel information to the base stations of which priority is higher for the resource allocated with the user equipment (step, S720).

In this case, the bit number of the signal on whether to utilize may be the value of the number of RBs allocated to the user equipment multiplied by 1 bit.

Figure 8:
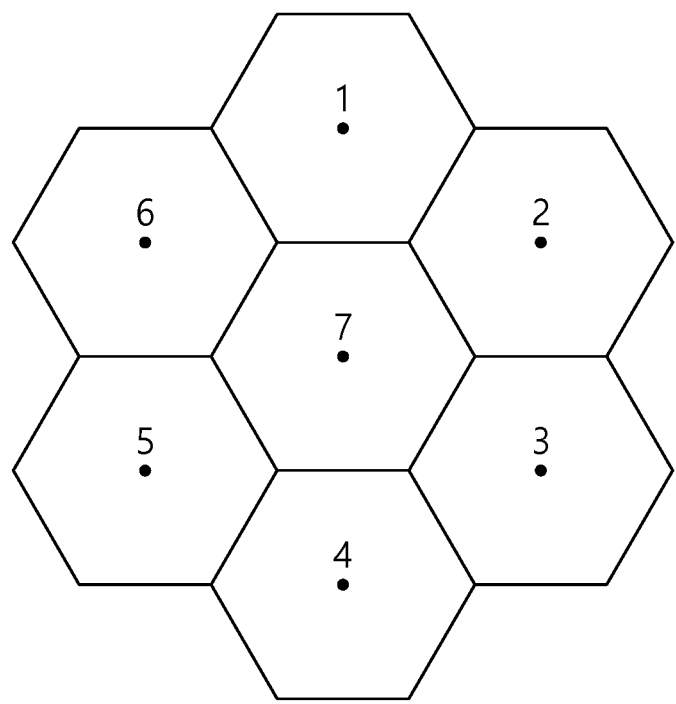
FIG. 8 is a diagram for describing a priority of utilizing a resource for each cell of $n^{th}$ RB according to an embodiment of the present invention.

FIG. 8 is a diagram for describing a priority of utilizing a resource for each cell of $n^{th}$ RB according to an embodiment of the present invention.

The number shown in the cell of FIG. 8 represents the priority of utilizing a resource for each cell of an RB. The priority of utilizing a resource is the lowest in the center cell, and the priority becomes lower in the neighboring cells in a clockwise direction.

It may be assumed that the user equipment allocated with $n^{th}$ RB requests whether to utilize the channel information for removing interference, and the base station of the serving cell is the base station of the cell that has $7^{th}$ priority in the $n^{th}$ RB.

In this case, the base station of the cell that has $7^{th}$ priority may request whether to utilize the channel information for removing interference to cells 1, 3 and 5 only. This is because the base station of the first cell already knows whether to utilize the channel information for removing interference since the base station of sixth and second cells located adjacent to the first priority cell should request whether to utilize the channel information for removing interference to the first cell of which priority is high in the corresponding resource. In addition, similarly, the base station of the third priority cell knows the information of the second and fourth priority cells, and the base station of the fifth cell knows the channel information for removing interference for sixth cell.

Accordingly, the base station of the serving cell may request whether to utilize the channel information to the cell of which priority is high among the neighboring cells, and through this, may decrease the amount of information exchange.

The base station of the serving cell may receive a response on whether to utilize the channel information for each RB from the base stations of the neighboring cell requested by itself (step, S730).

In this case, the base station receives a signal of a bit of the number of RBs of the user equipment multiplied by 1 bit for each neighboring base station.

The base station that receives the response signal may indicate whether to utilize the channel information for removing interference to the user equipment by a signal of 1 bit (step, S740).

The user equipment may feedback the channel information depending on whether to utilize the channel information which is received to the serving cell (step, S750).

The base station of the serving cell that receives the channel information may provide it to a neighboring cell (step, S760), and the base station of the neighboring cell that receives the channel information may adjust the MCS level of the signal that is going to be transmitted to the user equipment belonged to itself according to the feedback information.

Step S760 may be omitted. That is, the base station of the serving cell may not provide the channel information to the base station of the neighboring cell. In the case that the channel information is unable to be utilized, since the feedback information is not transferred to the base station of the serving cell and the base station of the neighboring cell from the user equipment, the MCS level of the signal may not be changed. That is, the possibility that the MCS level of the signal transmitted from the cell having a priority is changed is high, and the possibility that the MCS level of the signal transmitted from the cell of which priority is low is changed becomes relatively low.

Since the change of the MCS level is determined according to the priority, the MCS levels for the signals received from the base stations are not changed at one time or not changed like the ping-pong phenomenon. Through this, the user equipment may receive a signal in a stable channel state.

Figure 9:
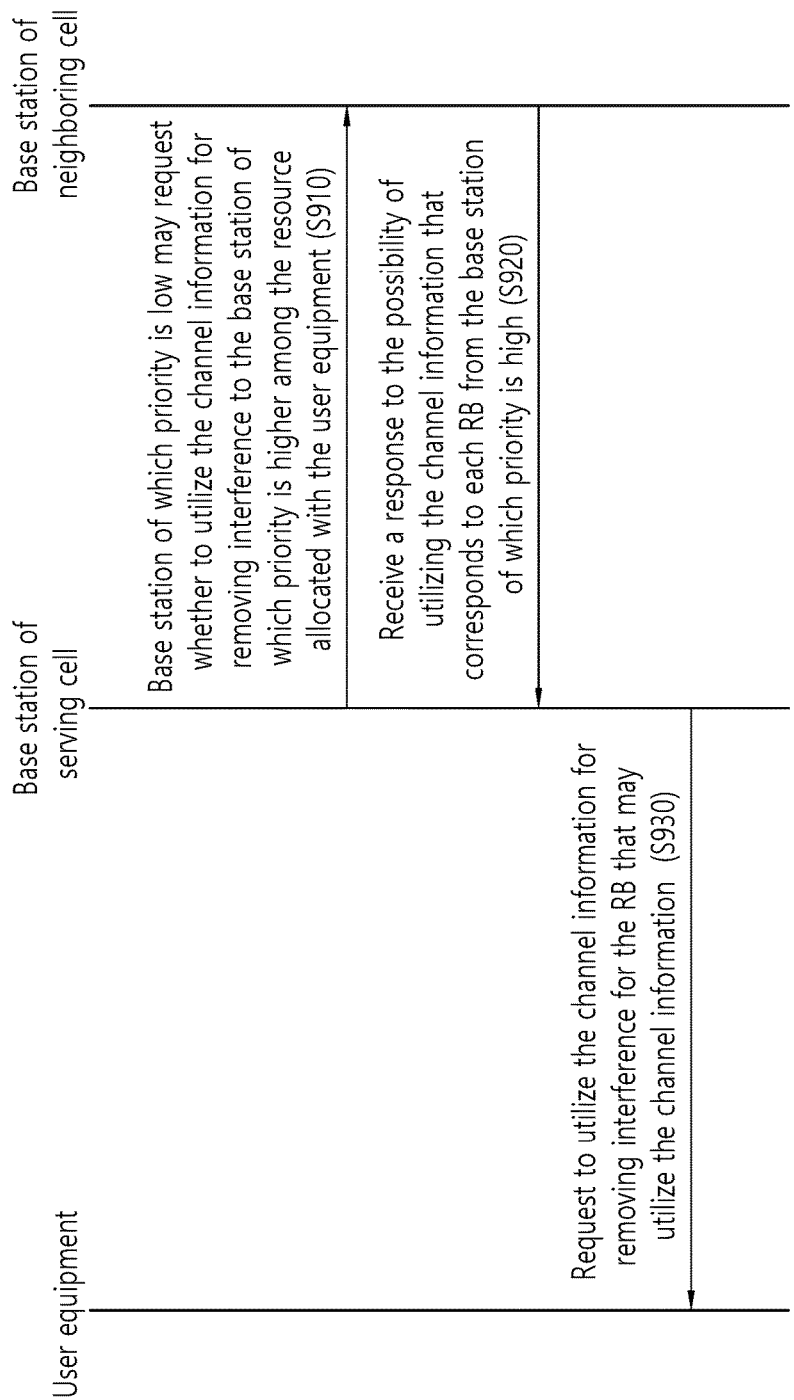
FIG. 9 is a control flowchart for describing a method for configuring a priority of utilizing inter-cell channel information according to an aspect of the present invention.

FIG. 9 is a control flowchart for describing a method for configuring a priority of utilizing inter-cell channel information according to an aspect of the present invention.

FIG. 9 shows the case that a base station of a cell of which priority is low requests whether to utilize a channel to a neighboring cell, and accordingly, requests a feedback of the channel information to a user equipment.

The base station of which priority is low may request whether to utilize the channel information for removing interference to the base station of which priority is higher among the resource allocated with the user equipment (step, S910).

Since the base station individually requests whether it is able to utilize the channel information for the resource allocated with the user equipment, the request signal may have a bit number of "1 bit× the number of user equipment RBs".

The number of the base station of which priority is high may be one or more, and the base station may transmit the signal of "1 bit× the number of user equipment RBs" for each base station that requests the possibility of utilizing the channel information.

The base station that requests whether it is able to utilize the channel information may receive a response to the possibility of utilizing the channel information that corresponds to each RB from the base station of which priority is high (step, S920).

In this case, the base station of which priority is low may receive a signal of "1 bit× the number of user equipment RBs" for each base station. That is, the response signal may be a flag signal that represents whether it is able to utilize the channel information, and the flag signals may be received as much as the number of RBs.

The base station that receives the response may request to utilize the channel information for removing interference for the RB that may utilize the channel information to the user equipment (step, S930).

That is, the base station may indicate whether to utilize the channel information for each RB, and the user equipment may feedback the channel information for a specific RB to the base station based on the received information.

As such, according to an aspect of the present invention, through the communication among the user equipment, the base station of the serving cell that transmits a signal to the user equipment and the base station of the neighboring cell, the environment of the channel information may be shared, and based on it, it may be determined whether to utilize the channel information.

Particularly, in the environment in which the change of an MCS level is frequent, the user equipment may remove an interference signal stably, and may decode its own signal.

Figure 10:
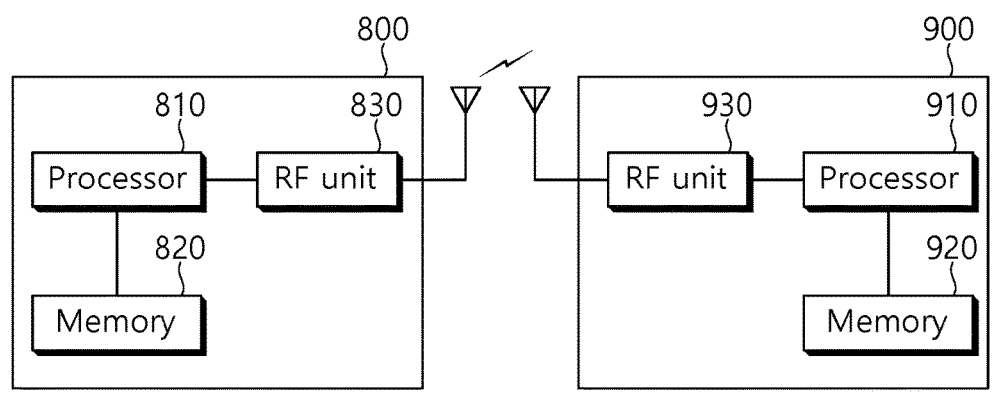
FIG. 10 is a block diagram of a wireless communication system according to an embodiment of the present invention.

FIG. 10 is a block diagram of a wireless communication system according to an embodiment of the present invention.

The base station 800 includes a processor 810, a memory 820, and an RF (radio frequency) unit 830. The processor 810 implements functions, processes, and/or methods as suggested herein. The layers of a wireless interface protocol may be implemented by the processor 810. The memory 820 is connected with the processor 810 and stores various pieces of information for driving the processor 810. The RF unit 830 is connected with the processor 810 and transmits and/or receives radio signals.

The user equipment 900 includes a processor 910, a memory 920, and an RF unit 930. The processor 910 implements functions, processes, and/or methods as suggested herein. The layers of a wireless interface protocol may be implemented by the processor 910. The memory 920 is connected with the processor 910 and stores various pieces of information for driving the processor 910. The RF unit 930 is connected with the processor 910 and transmits and/or receives radio signals.

The processor may include an application-specific integrated circuit (ASIC), a separate chipset, a logic circuit, and/or a data processing unit. The memory may include a read-only memory (ROM), a random access memory (RAM), a flash memory, a memory card, storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

In the embodiments, the methods are described with the flowcharts having a series of steps or blocks, but the present invention is not limited to the steps or order. Some steps may be performed simultaneously or in a different order from other steps. It will be understood by one of ordinary skill that the steps in the flowcharts do not exclude each other, and other steps may be included in the flowcharts or some of the steps in the flowcharts may be deleted without affecting the scope of the invention.

What is claimed is:

1. A method for removing inter-cell interference performed by a user equipment, comprising:
   receiving a signal from a serving cell and a neighboring cell adjacent to the serving cell;
   identifying a priority of the serving cell for feedback of channel information based on an identifier of a cell and a resource block;
   identifying whether to feedback the channel information of a received signal based on the priority; and
   transmitting the channel information to a base station of the serving cell depending on whether there is the identified feedback.

2. The method of claim 1, wherein in step of identifying whether to feedback, feedback of the channel information is performed when the priority is high.

3. The method of claim 1, wherein priority is determined based on a modular operation for the identifier of a cell.

4. The method of claim 3, when the serving cell is adjacent to 6 neighboring cells and n tiers are existed, the modular operation for determining a priority is performed based on Equation below $$\mathrm{mod}\left(N_{ID},1 + \sum_{k=1}^{n} 6k\right)$$

5. The method of claim 1, wherein the highest priority among the priorities is stored.

6. The method of claim 1, wherein the priority is determined based on a modular operation for the resource block.

7. The method of claim 1, wherein identifying whether to feedback includes requesting whether to feedback the channel information to the serving cell when the priority is low.

8. The method of claim 7, wherein identifying whether to feedback the channel information includes:
   being identified on whether to feedback the channel information from the neighboring cell that has higher priority than the priority of the serving cell; and
   receiving whether to feedback the channel information from the serving cell.

* * * * *